(No Model.)

C. J. BELL.
Car Brake and Starter.

No. 234,648. Patented Nov. 23, 1880.

Witnesses,
Henry Frankfurter.
Chas. H. Tallmadge

Inventor:
Charles J. Bell.
per F. F. Warner, his
Attorney.

UNITED STATES PATENT OFFICE.

CHARLES J. BELL, OF CHICAGO, ILLINOIS.

CAR BRAKE AND STARTER.

SPECIFICATION forming part of Letters Patent No. 234,648, dated November 23, 1880.

Application filed September 20, 1880. (No model.)

*To all whom it may concern:*

Be it known that I, CHARLES J. BELL, of Chicago, in the county of Cook and State of Illinois, have invented certain new and useful Improvements in Car Stoppers and Starters, of which the following, in connection with the accompanying drawings, is a specification.

Figure 1:
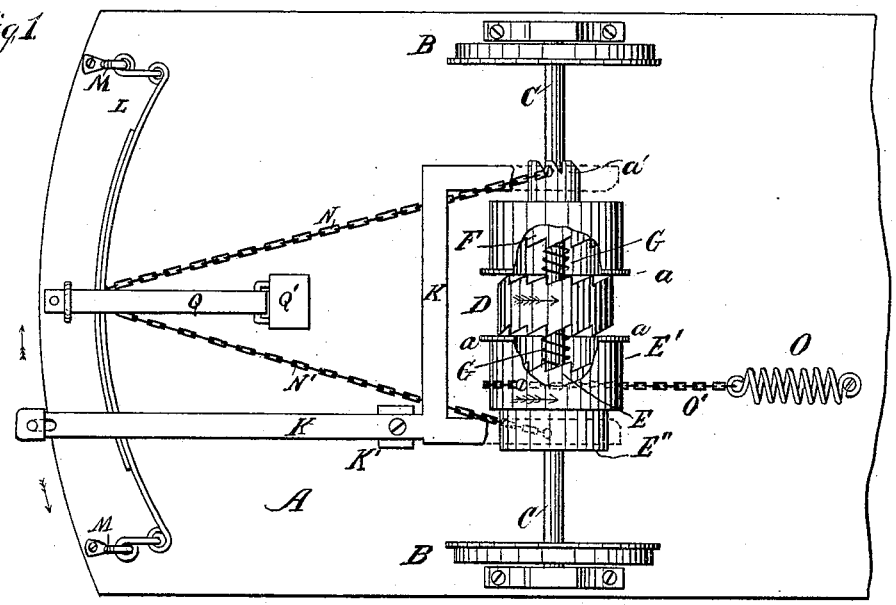
Figure 2:
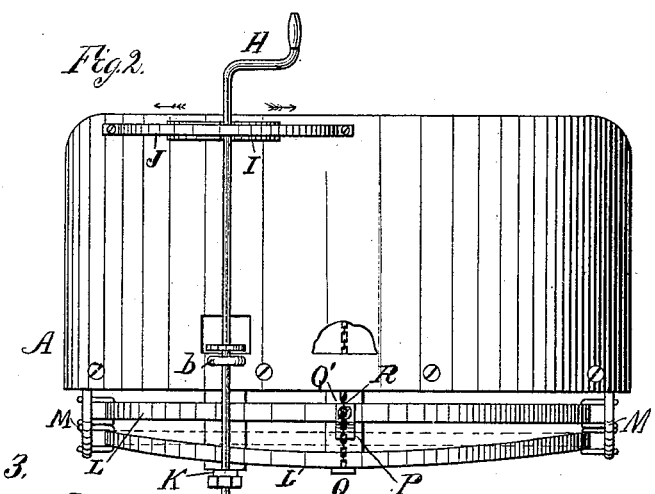
Figure 3:
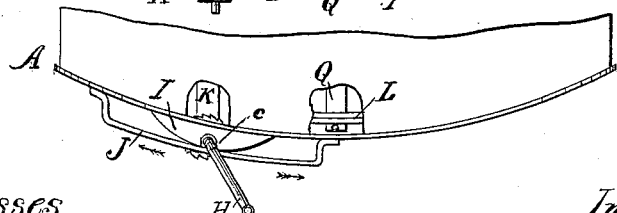

In the drawings, Figure 1 is a bottom view of a car provided with a stopper and starter embodying my invention. Fig. 2 is a front view of the same, and Fig. 3 is a top view of a portion thereof.

Like letters of reference indicate like parts.

The object of my invention is to simplify the construction and improve the operation of car stoppers and starters; and to that end it consist in the several features of construction hereinafter described and set forth.

In the drawings, A represents a street-car. B B are one pair of the wheels, and C is an axle to which they are rigidly applied.

D is a double ratchet-wheel, from which teeth project, those on one side being adapted to engage corresponding teeth when the ratchet is rotated in one direction, and those on the other side being adapted to be engaged by like teeth on a ratchet rotating in the same direction. The ratchet D is rigidly attached to the central part of the axle.

E is a ratchet-wheel mounted freely on the axle C and capable of sliding thereon. The inner side of this ratchet has teeth adapted to engage and disengage those teeth on the ratchet D which are nearest to the ratchet E.

E' is a shell or cap applied rigidly to the perimeter of the ratchet E. This shell projects laterally from the inner side of the ratchet E, and is adapted to cap or cover about one-half the face or perimeter of the ratchet D when the teeth of the said ratchets are in engagement with each other. The inner edge of the cap E' is outwardly flanged, as shown at a, the object of which flange is to broaden that edge of the cap, for the purpose hereinafter set forth. The cap E' thus becomes the perimeter, substantially, of the ratchet E, and it may be deemed best to make both in one part. E'' is the exposed part or hub of the ratchet E.

F is a capped ratchet, in all respects in its construction and operation like the capped ratchet E, excepting that the teeth of the ratchet F are adapted to engage and disengage the adjacent teeth of the ratchet D, and also excepting the fact that the hub of the ratchet F is smaller in diameter than the hub of the ratchet E, and has on its side or outer end the ratchet-teeth a', for the purpose hereinafter referred to.

G G are small spiral springs on the axle C, for the purpose of keeping the teeth of the ratchets E and F from accidentally engaging those of the ratchet D.

H is a brake-rod, having a bearing at b, which admits of the rod being rotated, and also of being oscillated on its bearing as a center.

I is a beveled block, having therein a notch, c, serving as a rest or bearing for the upper part of the brake-rod.

J is a spring-guard holding the brake-rod removably in the notch c. K is a forked lever, pivoted near its forked end to the end of a depending post or stud, K', and connected pivotally at its outer end to the lower end of the brake-rod. The arms of the forked end of the lever K pass across the sides or outer ends of the hubs of the ratchets E and F, as clearly shown in Fig. 1, but not so as to engage, when at rest, the teeth a'.

L and L' are half-elliptic springs, the ends of which are hinged to the depending posts M M. The concavity of these springs are toward the axle C.

N is a chain attached at one end to the perimeter of the hub of the ratchet F, and N' is a chain attached at one end to the perimeter of the hub of the ratchet E, and the other ends of both of these chains are attached to the central part of the spring L. The chain N is so attached to the hub of the ratchet F as to be wound thereon when the car is moving forward and the ratchet F is in engagement with the ratchet D, and the end of the chain N' is so attached to the hub of the ratchet E as to be unwound therefrom by the action of the spring L; in other words, the end of one chain should pass under and the other over the hub to which they are attached, respectively, as indicated in Fig. 1.

O is a spiral spring, and O' is a chain attached thereto and to the ratchet E, as shown in Fig. 1.

P is a lug depending from the central part of the spring L, and adapted to overlap the outer side of the spring L′ when the latter is raised sufficiently to be engaged thereby, as indicated by the dotted lines shown in Fig. 2.

Q is an arm, hinged at its inner end to the depending post Q′.

R is a chain, attached at its upper end to a staple or other fastening on the dash-board of the car, and at its lower end it is fastened or connected to the forward end of the arm Q. The length of the chain R is such as to allow the arm Q to support the spring L′ in its lowest position.

The operation of the mechanism now described is as follows: It is to be understood that the flanges $a\ a$ are in contact with each other about the central part of the ratchet D, instead of being separated, as shown in Fig. 1, the separation there shown being for the purpose of exposing to view parts which otherwise would be concealed. When the flanges $a\ a$ are thus in contact the teeth of the ratchet F just escape being engaged by the adjacent teeth of the ratchet D, and the teeth of the ratchet E should be in, or nearly in, contact with the teeth adjacent thereto on the ratchet D. The arms of the forked end of the lever K then hold the flanges $a\ a$ together in the position described. The forward movement of the car will cause the ratchet D to be rotated in the direction indicated by the arrow thereon shown; but this rotation will not be communicated to either the ratchet E or F; consequently the car may be drawn along as usual.

To stop the car the brake-rod is to be pushed out of the notch $c$, and also pushed laterally in such a direction as to throw one arm of the forked end of the lever K against the end of the hub of the ratchet F. The teeth of the ratchet F are thus thrown into engagement with the adjacent teeth of the ratchet D, and the teeth of the ratchet E are carried away from the adjacent teeth of the ratchet D. The consequence of this engagement is, that the ratchet F is rotated in the same direction with the ratchet D. By this means the chain N is wound upon the hub of the ratchet F, thus drawing the spring L inward, so that it resists the rotation, and consequently stops the car. While the arm of the forked end of the lever K is thus in contact with the end of the hub of the ratchet F, the teeth on the end of the said hub will not engage that arm during the rotation in the direction described, the inclination of those teeth being such as to prevent engagement therewith at that time; but if the ratchet F should tend to rotate in the opposite direction those teeth will engage said arm and overcome that tendency.

To start the car the brake-rod is to be moved to the other side of the notch $c$ sufficiently to release the engagement of the ratchet F with the ratchet D, and to carry the ratchet E into engagement therewith immediately and before the spring L springs back to its original position. While the chain N was being wound upon the hub of the ratchet F, the chain N′ would have become slack excepting for the action of the spring O and the chain O′, which is such as to take up the slack of the chain N′ by winding it upon the hub of the ratchet E. The force from the spring O is intended to be only sufficient for this purpose. The chain N′ being wound upon the hub of the ratchet E in the manner shown and described, and that ratchet being in engagement with the ratchet D at the time the spring L is drawn in toward the axle, that spring, in returning to its original position, will unwind the chain N′ from the hub of the ratchet E, and consequently rotate that ratchet in the direction indicated by the arrow thereon, and hence the ratchet D will be rotated in the same direction. The wheels on the axle C will thus be rotated in a direction to start the car. After the spring L has returned to its original position the brake-rod should be returned to the notch $c$. By this means all the parts will be returned to their original positions, and the car may be again drawn along as usual until it is again necessary to stop it, when the operation described must be repeated.

When the car is heavily loaded and its momentum is consequently great, the spring force should be increased. This I accomplish by drawing up the chain R so that the arm Q will raise the spring L′ into a position to be acted upon by the lug P during the rearward movement of the spring L. By this means I utilize the action of both the springs L and L′ for the purposes desired.

I make the brake-rod H rotary on its longitudinal or vertical axis, so that it may be employed to set the shoes of ordinary brakes in the usual manner, and I make it capable of being vibrated laterally for the purpose already set forth.

I do not here intend, however, to be restricted to the form of springs herein shown and described, as springs of any well-known kind may be substituted therefor with like effect. Neither do I intend to be restricted, necessarily, to a duplication of resisting-springs for stopping and starting the car, as only one may be sufficient for all practical purposes. Neither do I here intend to restrict myself to ratchets E and F, when provided with flanges $a\ a$, for those flanges are only essential when the meeting edges of the said ratchets are not broad or thick enough to furnish a surface sufficiently extended to operate satisfactorily for the purpose of enabling one ratchet to be moved laterally, in the manner described, by the other, when acted on by the lever K.

Having thus described my invention, what I claim as new, and desire to secure by Letters Patent, is—

1. The combination, in a car stopper and starter, of the loose laterally-yielding ratchets E and F and the rigid double ratchet D, arranged between and capped by the ratchets E and F, and all mounted on the same wheelaxle, the teeth on one side of the ratchet D being adapted to engage the teeth of the ratchet F, and those on the other side being adapted to be engaged by the teeth of the ratchet E alternately and during rotation in the same direction, a shifting-lever, a brake and starting spring and its flexible connections N and N′, and a take-up, substantially as and for the purposes specified.

2. The combination, in a car stopper and starter, of two brake and starting springs, one provided with a lug for engagement with the other, and the said other spring being adjustable to and from the said lug, in connection with means for adjusting the said adjustable spring, for the purposes set forth.

3. The combination of the laterally-oscillatory brake-rod H, also rotative on its longitudinal or vertical axis, with a car stopper and starter, substantially as and for the purposes specified.

CHARLES J. BELL.

Witnesses:
F. F. WARNER,
HENRY FRANKFURTER.